(12) United States Patent
Gangadharan et al.

(10) Patent No.: US 7,583,707 B2
(45) Date of Patent: Sep. 1, 2009

(54) SYSTEM, METHOD AND APPARATUS FOR CONTROLLING A NETWORK POST-DEMULTIPLEXING FUNCTION

(75) Inventors: Sreekanth Gangadharan, Santa Clara, CA (US); Claus Dahm, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 542 days.

(21) Appl. No.: 11/090,395

(22) Filed: Mar. 25, 2005

(65) Prior Publication Data

US 2006/0215669 A1    Sep. 28, 2006

(51) Int. Cl.
*H04J 3/06* (2006.01)
(52) U.S. Cl. .................... 370/516; 370/519
(58) Field of Classification Search ............. 370/412, 370/519, 516, 535, 351, 352, 353, 254, 355, 370/356, 413, 414, 415, 416, 517; 375/226, 375/371; 702/69
See application file for complete search history.

(56) References Cited

U.S. PATENT DOCUMENTS

| | | | |
|---|---|---|---|
| 4,757,452 A | | 7/1988 | Scott et al. |
| 5,684,798 A | | 11/1997 | Gauthier |
| 5,790,543 A | | 8/1998 | Cloutier |
| 5,930,253 A | * | 7/1999 | Brueckheimer et al. 370/395.61 |
| 6,195,333 B1 | * | 2/2001 | Wise .......................... 370/235 |
| 6,370,125 B1 | * | 4/2002 | Belk .......................... 370/312 |
| 6,434,606 B1 | * | 8/2002 | Borella et al. ............... 709/214 |
| 6,452,950 B1 | * | 9/2002 | Ohlsson et al. ............. 370/516 |
| 6,859,460 B1 | * | 2/2005 | Chen .......................... 370/412 |
| 6,862,298 B1 | * | 3/2005 | Smith et al. ................. 370/516 |
| 6,977,948 B1 | * | 12/2005 | Chennubhotla et al. ..... 370/516 |
| 7,170,901 B1 | * | 1/2007 | Katzur ........................ 370/412 |
| 2002/0064169 A1 | * | 5/2002 | Gummalla et al. .......... 370/412 |
| 2002/0078151 A1 | * | 6/2002 | Wickam et al. ............. 709/204 |
| 2004/0114570 A1 | * | 6/2004 | Vikberg et al. ............. 370/351 |
| 2005/0232309 A1 | * | 10/2005 | Kavaler ...................... 370/519 |

OTHER PUBLICATIONS www.telephonyonline.com, "New Products," 3 pages total, Aug. 17, 1998, www.telephonyonline.com/mag/telecom__new__products__30/.
www.actapress.com, "OTDM-WDM Propagation Impairments and Techniques to Improve Performance," 2 pages total, 2004, ACTA Press, www.actapress.com/paperinfo.aspx?paperID=18508.

* cited by examiner

*Primary Examiner*—Aung S Moe
*Assistant Examiner*—Abdullah Riyami
(74) *Attorney, Agent, or Firm*—Stolowitz Ford Cowger LLP

(57) ABSTRACT

A system, method and apparatus for controlling a network post-demultiplexing function such as dejittering is described. The method includes accessing data relating to a multiplexing function of said network. The data is processed according to a hysteresis property relating to the multiplexing function. Based on this processing, a jitter value associated with said multiplexing function is estimated, which predicts a worst-case jitter associated with the multiplexing function. A signal processing function related to the post-demultiplexing function is adjusted according to the estimated worst-case jitter value. In response to such adjustment, the buffering function adapts to anticipate a change in the worst-case jitter.

20 Claims, 8 Drawing Sheets

80

```
Control Network Post-Demultiplexing Function with
Hysteresis-based Process
81
```

↓

```
Provide Access to Network that is Based on Transmission
Quality Maintained with Hysteresis-based
Post-Demultiplexing Function Control
82
```

↓

```
Assess Fee for Allowing Access to Network
83
```

Fig. 8

SYSTEM, METHOD AND APPARATUS FOR CONTROLLING A NETWORK POST-DEMULTIPLEXING FUNCTION

TECHNICAL FIELD

The present invention relates to network functions. More specifically, embodiments of the present invention relate to a method and system for controlling a network post-demultiplexing function.

BACKGROUND

Networks transmitting voice calls, such as voice over packet networks, typically strive to maintain the voice quality of those calls. Quality of service (QoS) is thus a significant consideration for such networks. Interpacket delay variance, also referred to as jitter, is a difference between interpacket arrival and departure, which can affect voice quality and is thus a significant QoS metric in voice networks.

To function efficiently and economically, voice over packet networks and others typically strive to minimize bandwidth usage. Asynchronous transfer mode (ATM) networks dynamically allocate bandwidth. Various techniques are used with voice over packet networks to minimize bandwidth usage per call while maintaining perceptible voice quality. These techniques include compression, silence-suppression or voice activity detection (VAD), idle channel suppression (ICS) and others. For permanent virtual connections (PVC) associated with ATM adaptation layer 2 (AAL2), which packetizes voice data from serviced applications for the ATM network, sub-cell multiplexing comprises one such technique.

AAL2 sub-cell multiplexing is used to pack AAL2 packets, e.g., Common Part Sub-layer (CPS) packets, from the same or different channels of an AAL2 PVC into a single ATM cell. Such sub-cell multiplexing minimizes header overhead and maximizes bandwidth usage. In sub-cell multiplexing, each CPS packet is buffered until either an ATM cell containing the CPS packet gets filled, or a combined use timer (Timer_CU) associated with the multiplexer and signifying the most amount of time any CPS packet is buffered therein, expires.

The amount of time a CPS packet is buffered in a sub-cell multiplexer varies based on the number of channel identifiers (CIDs, e.g., channels) that are multiplexed, the number of those CIDs that are actively transmitting packets, the rate of packet transmission, and the packet sizes of each of those individual CIDs. A CID that is not transmitting packets could either be in silence-suppression (e.g., with VAD enabled), in ICS when enabled with channel associated signaling (CAS, e.g., transmission of signaling data within the voice channel), etc. Silence suppression occurs where there is a lack, pause, etc. in voice activity on the CID. ICS occurs based on idle CAS states such as when there is no call present on the CID.

With fewer CPS packets entering the multiplexer, each packet ends up being buffered for a larger amount of time before it is transmitted. This buffering-delay varies with silence patterns on calls that are already setup, and with activity such as call setup/teardown. Thus, each CPS packet can be delayed for less or more time than other such packets. Packet delay can vary at different times, from effectively zero, e.g., no delay, to a maximum delay set by the Timer_CU.

When a sizeable number of CIDs go into or come out of a state of no packet activity around the same time, this delay can have sudden and relatively significant variations. Such variations can contribute to jitter, because they affect the variation in delay experienced by CPS packets of an individual CID while they traverse the network and thus result in a variation of the inter-arrival times of those packets.

The end-to-end cumulative jitter experienced by packets has a 'network jitter' component caused by queuing in other network elements and a 'multiplexing jitter' component caused by the sub-cell multiplexer. The variation in network jitter is typically gradual. However, multiplexing jitter is typically sudden and can often be as large as the Timer_CU delay. While a larger Timer_CU delay may result in better bandwidth efficiency, it can cause a larger jitter and larger variance in jitter, which can impact QoS.

At the other end of the PVC, a de-multiplexer extracts individual CPS packets from arriving ATM cells. These de-multiplexed packets are then de-jittered at the jitter-buffers of the respective CIDs on which the packets arrived. Jitter-buffers are typically configured with an initial nominal jitter-delay that is greater than the worst-case jitter that is expected on the CID. Adaptive jitter-buffers adapt this nominal delay between the boundaries of the minimum jitter-delay and the maximum jitter-delay, according to the jitter observed in the arriving packets.

The nominal delay determines the average delay to which each packet in the jitter-buffer is subjected. The minimum jitter delay thus determines the least amount of delay contributed to the end-to-end delay by the jitter buffer, which is the lower bound of the nominal jitter-delay. Adaptive jitter-buffers adapt to changes in average jitter over the span of, e.g., several hundreds of arriving packets, as described in Equation 1 below. This is because the average jitter is calculated as a weighted moving average with a large averaging coefficient, in order to prevent the adaptation from being too sensitive to local fluctuations in network jitter.

$$\text{New} - \text{average} - \text{jitter} = \left[ \frac{1}{W}(\text{Jitter} - \text{in} - \text{latest} - \text{packet}) + \frac{(W-1)}{W}(\text{Old-average-jitter}) \right] \quad \text{Equation 1}$$

In equation 1, the averaging coefficient 'W' is typically 256 or 512.

Once the observed average jitter is calculated, the targeted nominal jitter delay is a multiple 'M' of the average jitter. Actual adjustment of the playout clock according to the nominal jitter-delay is typically accomplished immediately or during subsequent silence intervals.

Adaptive jitter buffers can thus be incapable of effectively (e.g., quickly) adapting to sudden changes in multiplexing jitter. This can cause significant packet dropping, e.g., during the period of slow adaptation when packets arriving with a new higher jitter, are determined to be late according to the playout clock and are dropped. On the other hand, early packets arriving with a new lower jitter continue to be subjected to longer than necessary delays in the jitter-buffer, thus increasing the average end-to-end delay. In addition, these early packets can potentially get dropped because of a jitter-buffer overflow.

To address packet dropping and unnecessarily long packet delays associated with the inability of conventional adaptive jitter buffers to quickly adapt to sudden multiplexing jitter changes, minimum jitter delay is configured higher than the sub-cell multiplexer Timer_CU setting. While it prevents the jitter-buffer from adapting lower than the worst-case multiplexing jitter, this approach can add jitter buffering delay even where unnecessary. The approach adds a minimum end-to-end delay determined by the Timer_CU to all CIDs even under the best circumstances.

For instance, the Timer_CU delay may be unnecessary, such as with a large number of calls setup on the PVC's CIDs during peak or other high traffic calling times. Another such instance may be where a large number of those calls are in packet activity, such as when they are in the midst of voice-activity, fax/modem session, have no VAD enabled, or have VAD disabled.

Such unnecessary delay can occur because conventional so-called adaptive jitter buffers are not truly adaptive in the lower jitter range, e.g., where the multiplexing jitter is below the setting of the Timer_CU. Hence, the end-to-end delay contributed by conventional jitter buffers is rendered as high as the Timer_CU setting irrespective of the real-time jitter conditions, which can itself impact QoS, reduce network efficiency, waste network resources and/or raise communication costs.

Thus conventionally, maximizing bandwidth efficiency with sub-cell multiplexing is balanced against added multiplexing and post-de-multiplexing jitter buffering contributes to end-to-end delay. Multiplexing jitter and delays associated with de-multiplexing jitter buffering can both impact perceptible voice quality. Multiplexing jitter can vary suddenly, depending on packet activity on the channels that are multiplexed. Conventional de-multiplexing adaptive jitter buffers on each channel can be incapable of adapting to such sudden variations in jitter quickly enough to adequately preserve voice quality. Further, the conventional approach to these issues can add unnecessary packet delay, which can concomitantly impact QoS, efficiency and economics.

BRIEF DESCRIPTION OF THE DRAWINGS

FIG. 8 is a flowchart of an exemplary method for operating a network, according to an embodiment of the present invention.

DETAILED DESCRIPTION

Figure 1:
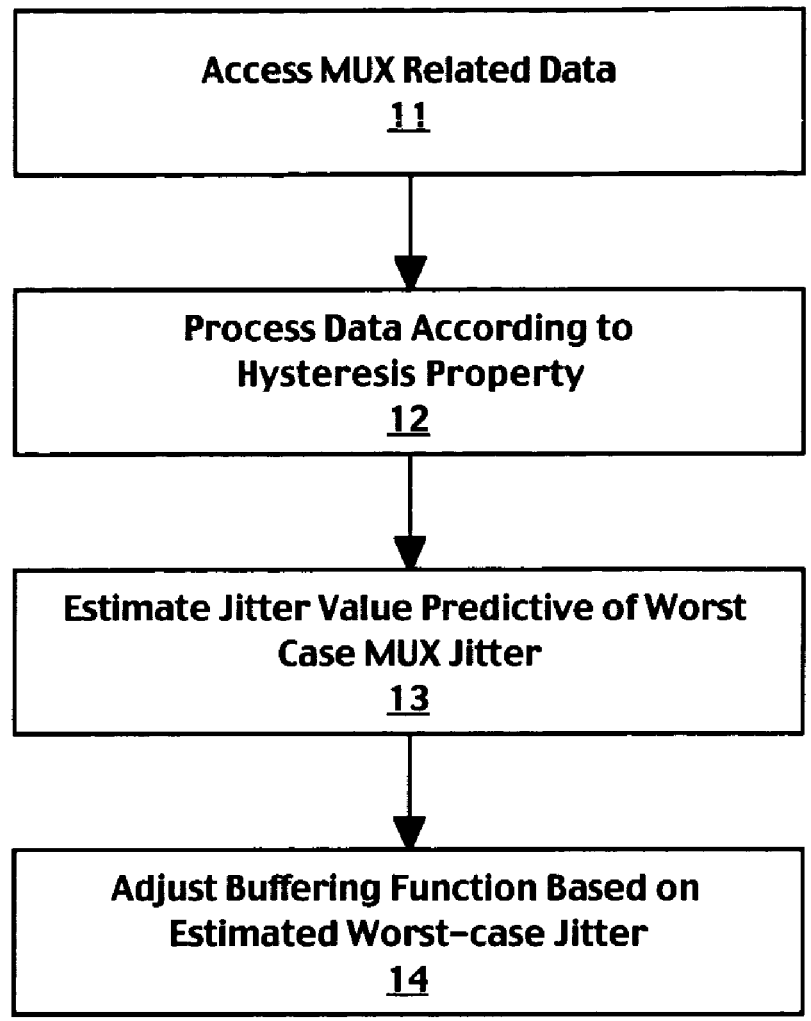
FIG. 1 is a flowchart of an exemplary process for controlling a network de-multiplexing function, according to an embodiment of the present invention.

Embodiments of the present invention relate to methods, systems and apparatus for controlling a network post-demultiplexing function such as dejittering, examples of which are herein described as follows. Reference is now made in detail to several embodiments of the invention, examples of which are illustrated in the accompanying drawing figures. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of exemplary embodiments of the present invention, numerous specific details are set forth in order to provide a thorough understanding of the present invention. However, one of ordinary skill in the art will realize that embodiments of the present invention may be practiced without these specific details. In other instances, well-known devices, methods, systems, processes, procedures, components, circuits and apparatus, protocols, standards, etc. have not been described in detail so as not to unnecessarily obscure aspects of the present invention.

Portions of the detailed description that follows are presented and discussed in terms of processes. Although steps and sequencing thereof are disclosed in figures herein (e.g., FIGS. 2, 5 and 7) describing the operations of these processes (e.g., processes 20, 50 and 70, respectively), such steps and sequencing are exemplary. Embodiments of the present invention are well suited to performing various other steps or variations of the steps recited in the flowcharts of the figures herein, and in a sequence, order, etc. other than that depicted and described herein.

Embodiments of the present invention provide a method, system and apparatus for controlling a network post-demultiplexing function such as dejittering. The method includes accessing data relating to a multiplexing function of said network. The data is processed according to a hysteresis property relating to the multiplexing function, which is derived at the demultiplexing (e.g., receiving) end. Based on this processing, a jitter value associated with said multiplexing function is estimated, which predicts a worst-case jitter associated with the multiplexing function. A buffering function related to the post-demultiplexing function is adjusted according to the estimated worst-case jitter value. In response to such adjustment, the buffering function adapts to anticipate a change in the worst-case jitter.

In one embodiment, a sub-cell de-multiplexer intelligently predicts the worst-case jitter introduced by the sub-cell multiplexer at the other end of a PVC, which helps the adaptive jitter-buffers adapt aggressively and in advance, anticipating such sudden jitter variations. The sub-cell de-multiplexer uses PVC level knowledge to forewarn the downstream jitter-buffer of each individual CID, of any potential sudden jitter variations due to change in packet-activity at the multiplexer. The PVC level knowledge of the worst-case multiplexing jitter is based on one or more feedback from the CAC module and/or the alarm monitor module, and on information derived from the arriving packet traffic itself.

The jitter-buffers use this information to update their target minimum jitter-delay. The jitter buffers then converge their calculated average jitter aggressively toward the newly observed jitter, using a small averaging coefficient W (e.g., where W=4, 8, etc.). The nominal jitter-delay target is continually set at the higher of M times this new average jitter and the target minimum jitter-delay. This nominal jitter-adaptation continues until the next update from the sub-cell de-multiplexer upon the next change in packet activity at the multiplexer.

Therefore, embodiments of the present invention allow the nominal jitter to be aggressively adapted higher than the worst sudden jitter. The embodiments of the present invention allow this aggressive adaptation to occur predictively and quickly, e.g., as compared with conventional averaging adaptive jitter buffers. Embodiments of the present invention thus allow jitter-buffers to be effectively adaptive in the whole range of possible jitter values that may be encountered. Embodiments of the present invention thus minimize end-to-end delay associated with network traffic.

Exemplary Method for Controlling a Network De-multiplexing Function

FIG. 1 depicts an exemplary computer implemented process 10 for controlling a network post-demultiplexing function, according to an embodiment of the present invention. De-jittering (e.g., jitter buffering) is one such post-demultiplexing function that can be controlled by embodiments of the present invention. Process 10 begins with step 11, wherein data relating to a multiplexing function of the network, derived at the demultiplexing end. is accessed. Information relating to the real-time packet activity at the sub-cell multiplexing function comprises one kind of such multiplexing function data.

Such multiplexing function data can be accessed from one or more sources at the demultiplexing end, and comprise one or more kinds of information, relating for instance to the operation of one or more network entities, such as voice over asynchronous transfer mode (VoATM) gateways. For instance, such information can include data from a VoATM gateway control path processor's connection admission control (CAC) module and/or alarm module, derived locally, relating to the operation of a remote sub-cell multiplexer (MUX) therein. Also for instance, such information can comprise data relating to the dynamic state of VAD on the CIDs of a PVC.

In step 12, the data is processed according to a hysteresis property relating to (e.g., associated with, etc.) the multiplexing function. Such data can be processed for instance by a component of a bearer path processor, such as a hysteresis processing module in a sub-cell de-multiplexer (Demux).

Based on this processing, in step 13, a jitter value associated with the multiplexing function is estimated, which predicts a worst-case jitter associated with the multiplexing function.

In step 14, a buffering function such as jitter buffering related to the de-multiplexing function is adjusted according to the estimated worst case jitter value. With this adjustment, the buffering function adapts to anticipate a sudden change in the jitter. Advantageously, embodiments of the present invention allow the jitter buffer of a VoATM gateway digital signal processor (DSP) to aggressively adapt to anticipate such sudden jitter changes, which has the benefit of deterring packet dropping while possibly reducing de-jittering delays.

Exemplary System

Figure 2:
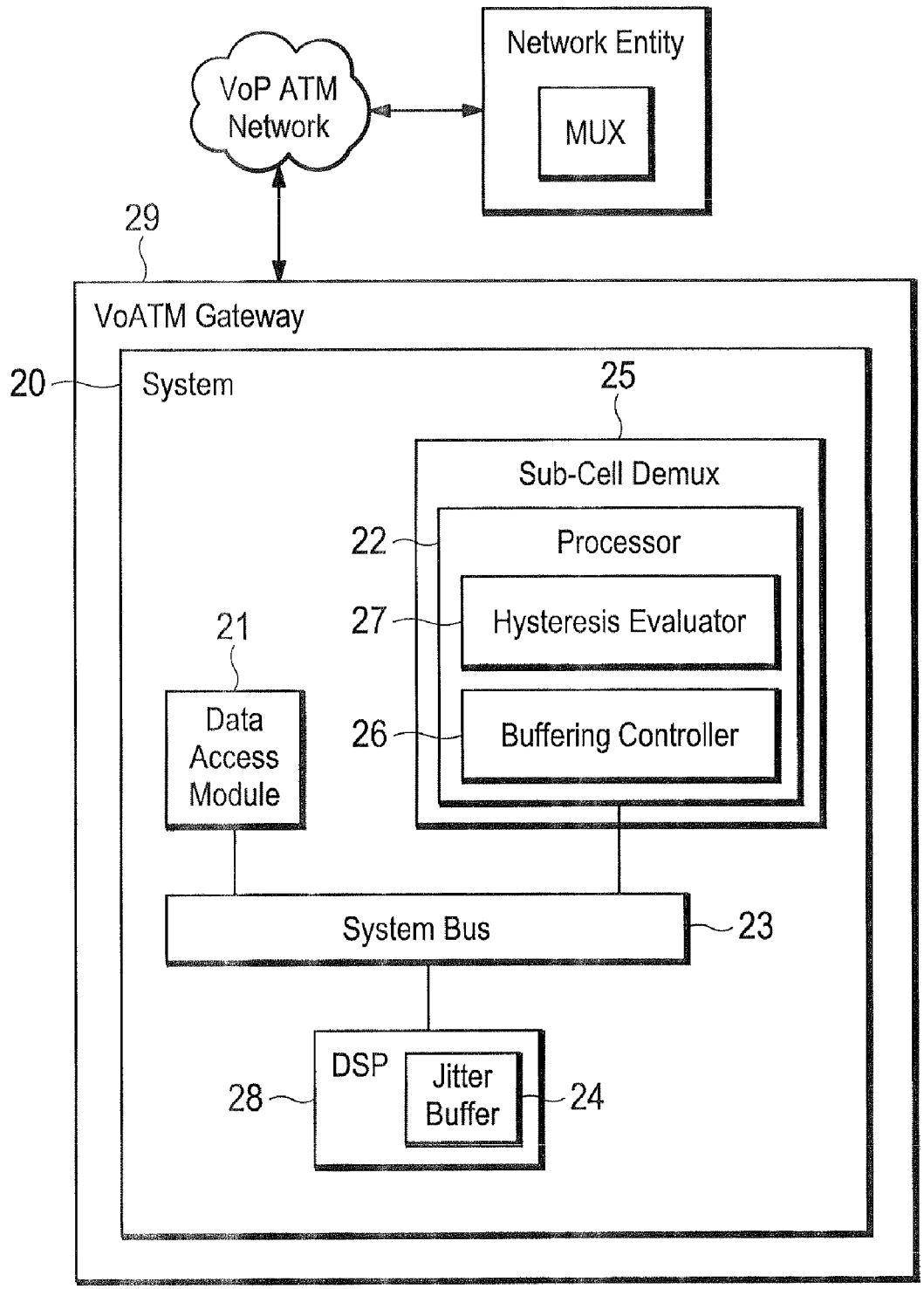
FIG. 2 depicts an exemplary system for controlling a network de-multiplexing function, according to an embodiment of the present invention.

FIG. 2 depicts an exemplary computer based system 20 for controlling a network post-demultiplexing function, according to an embodiment of the present invention. De-jittering is one such post-demultiplexing function that can be controlled by embodiments of the present invention. In one embodiment, system 20 functions according to process 10, described above. In one embodiment, system 20 comprises means for performing functions associated with process 10. System 20 can be implemented in hardware, software, firmware, and combinations thereof.

System 20 has a data access module 21 for accessing data relating to a network multiplexing function. A processor 22 is coupled to data access module 21 with a system bus 23. Processor 22 has a hysteresis evaluator 27, which performs computations and other processing functions which help processor 22 evaluate the accessed data according to a hysteresis property relating to the multiplexing function. Processor 22 thus estimates a jitter value associated with the multiplexing function, which predicts a worst case jitter associated therewith. In one embodiment, processor 22 comprises a bearer path processor disposed within a network entity 29 such as a VoATM gateway.

Processor 22 has a buffering controller 26, which based on the jitter estimate, helps processor 22 control a jitter buffer 24 associated with a sub-cell Demux 25 according to the estimated worst case jitter value. In response to this adjustment, jitter buffer 24 adapts to anticipate a change in the jitter. In one embodiment, jitter buffer 24 is disposed in a DSP 28 of network entity 29. System 20 allows the operation of network entity 29 to aggressively adapt to anticipate such sudden jitter changes, with benefits including deterring packet dropping with reduced de-jittering delay. In one embodiment, system 20 is disposed to function within a network based system environment, e.g., as a component system, sub-system, etc. thereof.

Exemplary Network Based System Implementation

Figure 3:
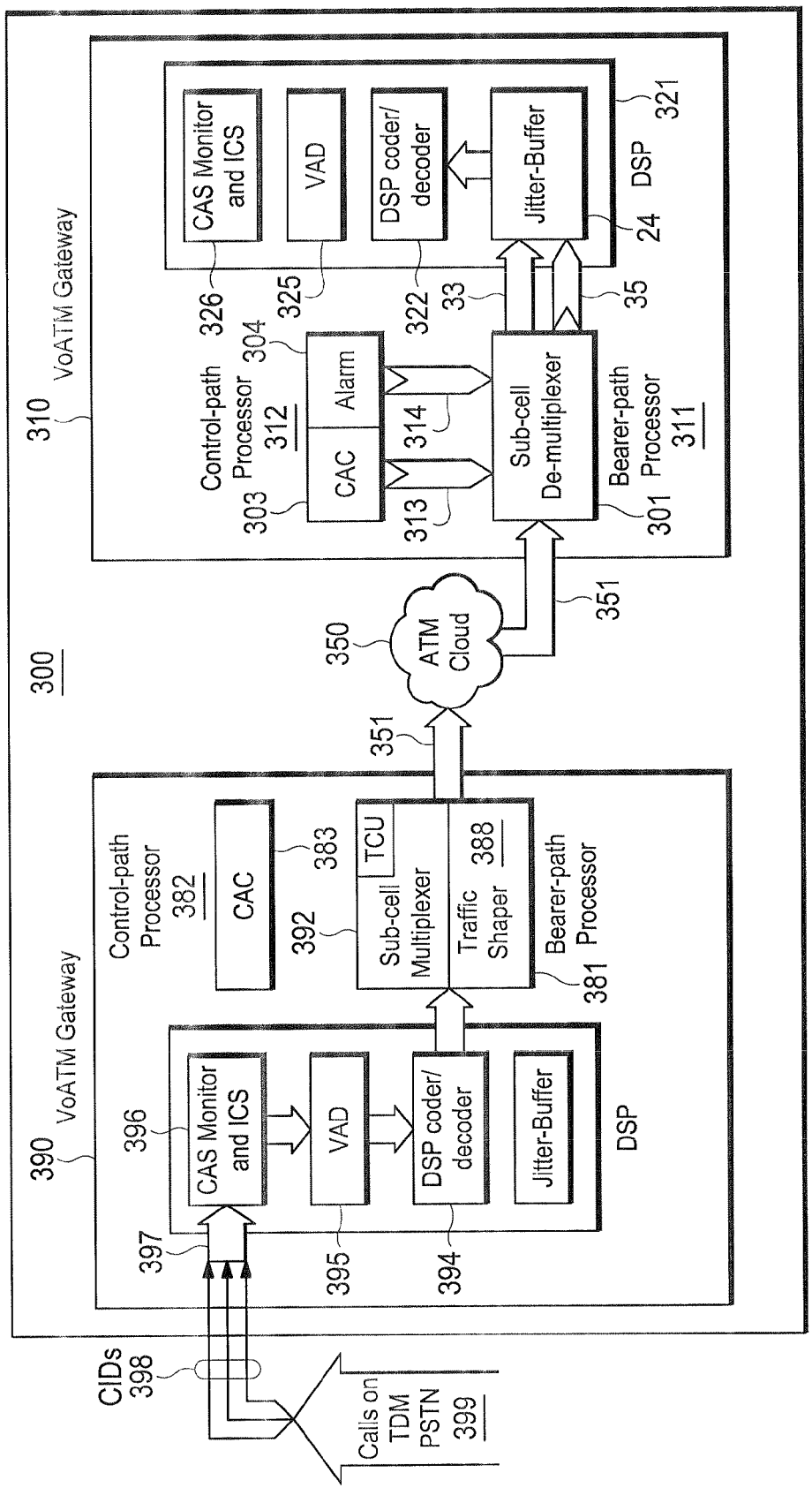
FIG. 3 depicts an exemplary network system environment, according to an embodiment of the present invention.

FIG. 3 depicts an exemplary network based system environment 300, according to an embodiment of the present invention. In one embodiment, system 20 is disposed to function within network based system environment 300. In one implementation, voice data in traffic in network environment 300 is encapsulated according to a communication protocol such as AAL2.

Network environment 300 has a VoATM network 350, through which VoATM gateway 390 is coupled with VoATM gateway 310 with PVC 351. VoATM gateway 390 has a control path processor 382, which has a connection admission control (CAC) module 383. VoATM gateway 390 has a bearer path processor 381, which has a traffic shaper 388 and a sub-cell multiplexer (MUX) 392, which has a timer CU. VoATM gateway 390 has a digital signal processor (DSP) 391.

Calls 399 are channeled from a time division multiplexed (TDM) public switched telephone network (PSTN) to a TDM PSTN connection 397 on CAS and ICS monitors 396. In one implementation, each of calls 399 is carried on an individual channel, each of which is associated with a unique channel identity (CID) 398. The calls comprise packetized voice data, which is encapsulated per AAL2 (or another protocol, standard, etc. with which network environment 300 functions).

Within DSP 391, CIDs (e.g., calls thereon) are monitored for channel associated signaling (CAS) and idle channel suppression (ICS) with CAS/ICS monitor 396. Voice activity detection (VAD) is applied to the calls with VAD detector 395. The calls are then decoded in DSP coder/decoder (codec) 394. DSP 391 can perform jitter buffering on the received packet traffic, with a buffer 393. For transport through network 350 via PVC 351, the calls are multiplexed by sub-cell MUX 392. In packetizing the calls, MUX 392 may delay a CPS packet by a maximum amount of time determined by the setting of Timer_CU TCU.

VoATM gateway 310 has a control path processor 312, which has a CAC module 303 and an alarm module 304. VoATM gateway 310 has a bearer path processor 311, which has a sub-cell Demux 301. VoATM gateway 310 has a DSP 321. DSP 321 can have a CAS/ICS monitor 326 and a VAD detector 325 that act on the incoming PTSN stream and thus affect the transmitted packet traffic. DSP 321 has a codec 322 and jitter buffer 24.

Packetized voice traffic arriving via PVC 351 at VoATM gateway 310 are demultiplexed by Demux 301. The demultiplexed calls 33 are subject to post-demultiplexing processing in DSP 321. Post-demultiplexing processing performed with DSP 321 includes jitter buffering with jitter buffer 24. Information related to multiplexing functions to which calls are subjected remotely, such as activity, operations, etc. of sub-cell MUX 392 in VoATM gateway 390 that can affect jitter, is accessed from control path processor 312 and processed with bearer path processor 311. Results of this processing control a function of DSP 321 to anticipate changes in the jitter introduced at remote VoATM gateway 390.

In the present embodiment, sub-cell de-multiplexer 301 uses PVC level information, e.g., global knowledge derived from PVC 351, from individual CIDs thereof, etc., to forewarn downstream jitter buffer 24, e.g., for each individual CID, of any potential sudden jitter variations due to change in packet-activity at the sub-cell MUX 392. The PVC level knowledge of the worst-case multiplexing jitter expectable from MUX 392 is based both on feedback signal 313 from the CAC module 303 and feedback signal 314 from the Alarm Monitor module 304, as well as on information derived from the arriving packet traffic itself.

Sub-cell Demux 301 processes this information and generates a corresponding bearer path jitter control message 35, which propagates information related to multiplexing jitter introduced at the remote VoATM gateway 390 to jitter buffer 24. In one implementation, the addressing format (e.g., DSP, channel CID) associated with the bearer path jitter control message 35 resembles (e.g., is similar to) other control message traffic from control path processor 312 sent for example to configure minimum, nominal, and maximum jitter delays associated with jitter buffer 24. In the present embodiment, bearer path jitter control message 35 is sent in-band, e.g., along with regular bearer packets.

Bearer path jitter control message 35 conveys to jitter buffer 24 information relating to the worst case multiplexing jitter introduced at the remote VoATM 390 that is associated with the calls. Jitter buffer 24 uses this jitter information to adjust its dejittering activities accordingly. For instance, jitter buffer 24 uses this information to determine an updated minimum delay with which to perform its dejittering functions.

The jitter-buffers, e.g., jitter buffer 24, use this information to update their target minimum jitter-delay. The jitter buffers can then converge their jitter-buffer nominal delay, calculated based on average jitter, aggressively toward the newly observed jitter, e.g., using a small averaging coefficient 'W,' wherein, e.g., W=4 or 8. The nominal jitter delay target is continually set at the higher of a multiple 'M' times this new average jitter and the target minimum jitter delay.

This nominal jitter adaptation continues until the next update from the sub-cell Demux 301 upon the next change in packet activity at the MUX 392. Advantageously therefore, the nominal jitter setting can be aggressively and quickly (e.g., effectively and/or relatively instantaneously) adapted higher than the worst sudden jitter. This can be beneficial, e.g., compared to conventional adaptive jitter buffering, which is rather based on data gathered over a period of several hundreds of arriving packets. Further, embodiments of the present invention allow the jitter-buffers to be truly adaptive in the whole range, which can advantageously reduce end-to-end delay.

Figure 4:
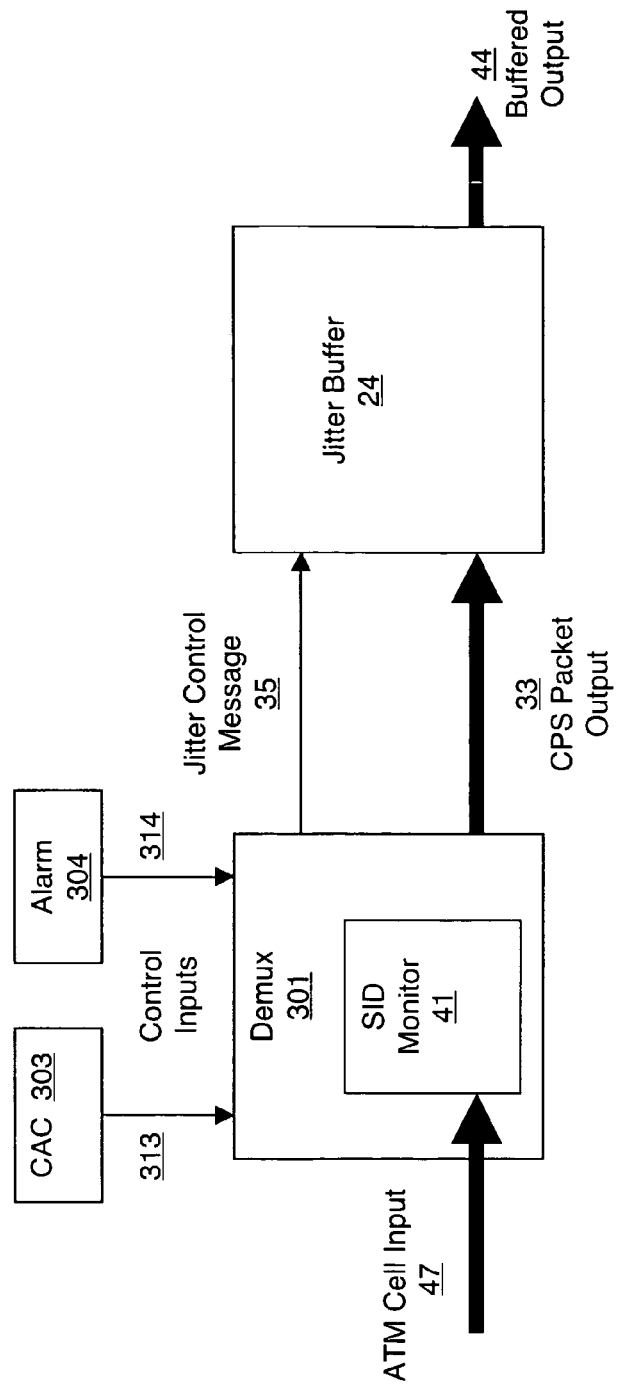
FIG. 4 depicts an exemplary sub-cell de-multiplexer interface, according to an embodiment of the present invention.

FIG. 4 depicts an exemplary sub-cell de-multiplexer interface 40, according to an embodiment of the present invention. Sub-cell Demux 301 derives the state of packet-activity on each CID at the MUX 392 with access to data related thereto from various sources. Related information can be gathered with monitoring traffic arriving at Demux 301 itself. In one embodiment, Demux 301 accesses jitter-related information from Silence Insertion Descriptor (SID) data from packets comprising ATM cell input 47 with a SID monitor 41. In one embodiment, Demux 301 accesses jitter-related information from feedback control inputs 313 and 314, from CAC 303 and alarm module 304, respectively.

For instance, at every point, CAC module 303 is aware of the number of CIDs on the PVC, which is updated when CIDs are added or deleted from the PVC. CAC module 303 is also aware of CIDs that are in a fax/modem up-speed or down-speed state and CIDs that are in ICS state, such as where no call is present on them (e.g., ICS is applicable in the case of CAS signaling). At every point, Alarm Monitoring Module 304 is aware of CIDs that have entered an alarm state and thus not in packet-activity. And at every point, the proposed Demux 301 keeps track of CIDs that are in a silence suppressed state based on SID monitor 41 monitoring SID packets and subsequent voice packets in the incoming packet traffic 47.

Demux 301 processes the jitter related information, derived from SID data from ATM cell input 47 and jitter related feedback from control inputs 313 and 314 and generates jitter control message 35. In one embodiment, jitter control message 35 is propagated in-band with CPS packet output 33. Jitter buffer 24 uses the information propagated with jitter control message 35 to adjust its dejittering function accordingly to provide jitter buffered output 44. A post-demultiplexing function of one embodiment, exemplified by dejittering, is described in detail as follows below.

In the description below, 'P' denotes the AAL2 CPS packet size of each CID and 'T' the packetization period of each CID. P changes during transitions of a CID to and from (i) a state of up-speed, (ii) a state of down-speed, (iii) a state of silence suppression, (iv) a state of ICS, and (v) a state of alarm. P=0 in states (iii), (iv) and (v). T changes only during transitions to and from up-speed and down-speed states.

The sub-cell de-multiplexer 301 in one embodiment of the present invention, derives this information from CAC module 303 and Alarm Module 304 to maintain the (P, T) state of each CID. Demux 301 also keeps track of the dynamic state of silence suppression of each CID, e.g., based on the arrival of SID packets and subsequent voice packets on that CID. This differs from conventional CAC modules that use a static VAD factor for their bandwidth calculations.

In the present embodiment, upon accessing these data, Demux 301 calculates the worst-case jitter possible due to the multiplexer on each (P, T) transition. This PVC level jitter knowledge is then communicated downstream in-band to adjust the jitter buffer 24. For instance, the jitter buffer of each CID that is not in an up-speed state can thus aggressively and quickly adapt to that worst case jitter. The adaptation can either be accomplished immediately or during subsequent silence intervals. The in-band communication of the worst case jitter estimate is triggered based on a hysteresis in the calculated worst-case jitter property on the PVC.

Advantageously, such worst-case jitter communication precedes (e.g., is in advance of, predicts, etc.) worst-case jitter changes. The communication is also conservative, which has the benefit of minimizing packet loss at the jitter buffer 24. Further, the in-band communication 35 is less frequent and uses less internal bandwidth.

In one embodiment, the in-band propagation of the worst case jitter information through bearer-path control message 35 resembles (e.g., is similar to) the control message sent from the control-path processor 312 to configure the minimum, nominal and maximum jitter delays of the jitter buffer 24. In the present implementation, the in-band message 35 conveys the worst-case multiplexing jitter information that determines the updated minimum delay adjustment for the downstream jitter buffer 24.

In one embodiment, Demux 301 is implemented in datapath network processor 311 and the jitter buffer functionality 24 is implemented in the DSP 321, both disposed within the same hardware such as VoATM gateway 310. Hence, the in-band propagation of the worst case jitter estimate calculated with processor 311 to the jitter buffer 24 is fast and thus timely.

In sub-cell MUX 392, the worst-case delay a bearer packet experiences occurs when all of the following hold true:

(i) the packet under consideration is the first complete or partial packet into MUX 392 after the last multiplexed ATM cell was transmitted;

(ii) the packet has the smallest byte-size, as this leaves the largest remaining part of the cell payload (e.g., 47 Bytes for ATM) to be filled (the worst case is the smallest partial packet that has a size of 1 Byte, leaving 46 Bytes to be filled; and (iii) each CID has finished transmitting its last packet and has just started packetizing its next one when the packet arrives at the multiplexer.

In one embodiment, SIDs and/or peer-to-peer packets are not considered in calculating the estimated worst case jitter; ignoring them yields an even higher bound on the worst-case delay estimate and is thus conservative. Further, the worst-case delay estimate of one embodiment is bound with the Timer_CU delay observed in the ATM cells arriving at Demux 301. The inter-arrival time between a partially filled ATM cell and its predecessor yields the current Timer_CU delay of the MUX 392, ignoring the effects of the network jitter.

The Timer_CU delay is thus determined based on an average. The sub-cell MUX 392 can be of fixed or adaptive type based for example on whether its Timer_CU delay response setting is fixed or adaptive. The Demux 301 is configured with such information, which relates to characteristics, such as the type, of the MUX 392. Where MUX 392 is of the fixed type, the Timer_CU delay is calculated as a cumulative average. Where MUX 392 is of the adaptive type, a new average is calculated after each transition, because e.g., the Timer_CU delay of the MUX 392 adapts at these transitions.

Exemplary Hysteresis-Based Processes

In the following discussion, the definitions of Table 1 below apply.

TABLE 1

$P_i$ - Packet size of the AAL2 CPS-PT of the $i^{th}$ distinct '(codec, packetization length) pair' supported by all AAL2 profiles (codec - process for compression/decompression associated with DSP of voice, speech, audio signals, etc.);
$T_i$ - Packetization period of the $i^{th}$ distinct '(codec, packetization length) pair' supported by all AAL2 Profiles;
$n_i$ - Number of CIDs with (P, T) equivalent to $(P_i, T_i)$ that are in packet activity;
$N_i$ - Lowest multiplying factor of the packet size $P_i$ such that the result is greater than 47 Bytes, e.g., $(N_i - 1) * P_i < 47 \leq N_i * P_i$;
K - Sum of all the $N_i$'s corresponding to all the '(codec, packetization length)
pairs', e.g., $K = \sum_i N_i$;

$t_{(i, m)} = m*T_i$, $m = 1, 2, \ldots, N_i$ multiples of packetization period time;
$c_{(i, m)} = m*P_i$, $m = 1, 2, \ldots, N_i$ Sub-cell multiplexer contribution of a single CID with $(P_i, T_i)$ at $t_{(i, m)}$;
$T_{CU}$ - Timer_CU of the multiplexer determined at the de-multiplexer;
$D'_{max}$ - Worst-case 'multiplexing jitter' predicted;
$D_{max}$ - Worst-case 'multiplexing jitter' predicted based on hysteresis; and
$J_{max}$ - Worst-case 'multiplexing jitter' predicted based on hysteresis, bound by the delay of Timer_CU, which in one embodiment comprises the value that is communicated to the downstream jitter-buffers, e.g., jitter buffer 24

Demux 301 adds K elements $(P_i, n_i, t_{(i,m)}, c_{(i,m)})$ into a priority queue data structure upon initialization, e.g., of system 20. Here, $m=1, 2, \ldots, N_i$ and $i=1, 2, \ldots$ corresponding to all distinct '(codec, packetization length) pairs' in all the supported AAL2 profiles. The elements $(P_k, n_k, t_k, c_k)$ are added into the priority queue in the increasing order of $t_k$, and in the decreasing order of $c_k$ among the elements with the same $t_k$.

An addition or deletion of a CID, or (P, T) transitions of a CID results in a respective increase or decrease of the corresponding $n_i$ by 1. An addition of a CID, a transition of a CID from silence to voice activity or setup of a call on a CID, result in an increase in the corresponding $n_i$ by 1. A deletion of a CID, a transition of a CID from voice activity to silence or teardown of a call on a CID, each result in a decrease in the corresponding $n_i$ by 1. A Fax-modem up-speed (down-speed) event that causes a (P,T) transition results in a decrease (increase) in the $n_i$ corresponding to the '(voice codec, voice packetization period) pair' by 1, and an increase (decrease) in the $n_i$ corresponding to the '(up-speed codec, up-speed packetization period) pair' by 1. The increments and decrements of the common $n_i$ of all $N_i$ elements $(P_i, n_i, t_{(i,m)}, c_{(i,m)})$, $m=1, 2, \ldots, N_i$, are efficiently implemented in one embodiment with having a single variable for $n_i$, that each of these elements of type 'i' have a pointer to.

At each transition, defined as the addition or deletion of a CID or a (P,T) transition of a CID, the sub-cell de-multiplexer 301 traverses the elements in the priority queue data-structure $$\{(P_k, n_k, t_k, c_k) | k=1, \ldots, K\}$$

where k is the ordinal number of the element. The traversal starts with the element $(P_1, n_1, t_1, c_1)$ (e.g., where k=1), which is in one embodiment the element $(P_i, n_i, t_{(i,m)}, c_{(i,m)})$ with the lowest $t_{(i,1)} = 1*T_i$.

During the traversal, a value for $\Sigma(n_k * P_k)$ is calculated at each element of the set. $D'_{max}$, the theoretical worst-case jitter possible is thus calculated as $$D'_{max} = t_{(i, m)} \text{ at element } k=k'$$

where k' is such that $$\sum_{k=1}^{k'-1} (n_k * P_k) < 47 \leq \sum_{k=1}^{k'} (n_k * P_k).$$

Equation 2

In the present embodiment, the $t_k$ at each element is considered a candidate for the worst-case jitter during the priority queue traversal. The $t_k$ at the element with k=k', where k' satisfies Equation 2, is chosen as the worst-case jitter estimate, e.g., with which jitter buffer 24 will be adjusted.

Sub-cell Demux 301 uses a computer implemented process to calculate a more conservative estimate of worst-case jitter based on hysteresis associated with the function of sub-cell Demux 301. According to this process, the worst-case jitter estimate calculated from each priority queue traversal should be such that it satisfies Equation 2 even, e.g., with the exclusion of the two largest contributor CIDs from among the CIDs that are in packet activity. In one embodiment, an exception applies when the $t_k$ that is being considered as a candidate for the worst-case jitter estimate is equal to the worst-case jitter estimate calculated from the previous traversal. Where the $t_k$ under consideration for the worst-case jitter estimate is equal to the worst-case jitter estimate calculated from the previous traversal, the worst-case jitter estimate calculated from the priority queue traversal could be such that it satisfies Equation 2 even with the exclusion of the single largest contributor CID from among the CIDs that are in packet activity.

In this discussion, $C_{max1}$, $C_{max2}$ are the two largest sub-cell contributions of all the contributor CIDs until the current element $(P_k, n_k, t_k, c_k)$ during the priority queue traversal and $$C_{max1} \geq C_{max2}.$$

$C_{max1}$ can equal $C_{max2}$ if there are 2 CIDs ($n_k \geq 2$) with $c_k = C_{max1}$. At initialization, $$C_{max1} = C_{max2} = 0.$$

In one embodiment, $C_{max1}$ and $C_{max2}$ are re-calculated each time the priority queue traversal reaches a group of elements $\{(P_k, n_k, t_k, c_k) | (k_1 \leq k \leq k_2), (t_{k1} = t_{(k1+1)} = \ldots = t_{k2}), (t_{(k1-1)} \neq t_{k1})$ and $(t_{k2} \neq t_{(k2+1)})\}$ that has a new $t_k$. Elements with the same $t_k$ are arranged in the decreasing order of $c_k$ within the priority queue. Thus, re-calculation of the new $C_{max1}$ and $C_{max2}$ only requires comparison with $c_{k3}$, $c_{k4}$, where $$k1 \leq k3 < k4 \leq k2.$$

Here, elements with $k=k3$ and $k=k4$ are the first two elements (if any) in the priority queue traversal, from among elements with $k\_[k1,k2]$, that have a non-zero $n_k$ ($n_k \neq 0$).

For instance, let $(t_{(p-1)} \neq t_p)$, $(t_p = t_{(p+1)})$ and $(t_{(p+1)} \neq t_{(p+2)})$. Then, elements with $k=p$ and $k=(p+1)$ form a set of two elements with a new value of $t_k$. If $n_p \geq 2$, the calculation of the new $C_{max1}$ and $C_{max2}$ values involves comparison of the old values with values $c_p$ and $c_p$. If $n_p = 1$ and $n_{(p+1)} \geq 1$, the calculation involves comparison with $c_p$ and $c_{(p+1)}$. If $n_p = 1$ and $n_{(p+1)} = 0$, the calculation involves comparison only with $c_p$. On the other hand, if $n_p = 0$ and $n_{(p+1)} = 0$, the traversal moves on to the element with $k=(p+2)$, while retaining the old values of $C_{max1}$ and $C_{max2}$. Thus, $$C_{max1}, C_{max2} = \begin{cases} \text{largest\_two}(C_{max1}(\text{old}), & \\ C_{max2}(\text{old}), c_{k3}, c_{k3}), & \text{if } (n_{k3} \geq 2) \\ \text{largest\_two}(C_{max1}(\text{old}), & \\ C_{max2}(\text{old}), c_{k3}, c_{k4}), & \text{if}(n_{k3} = 1) \text{and}(n_{k4} \geq 1) \\ \text{largest\_two}(C_{max1}(\text{old}), & \text{if}(n_{k3} = 1), \text{ and} \\ C_{max2}(\text{old}), c_{k3}), & k4 \text{ does not exist} \\ (C_{max1}(\text{old}), C_{max2}(\text{old})), & \text{if both } k3 \text{ and} \\ & k4 \text{ do not exist} \end{cases}$$

Equations 3A-3D

An exemplary process with which the worst-case jitter estimate is determined using such values, in one embodiment is described as follows.

Figure 5:
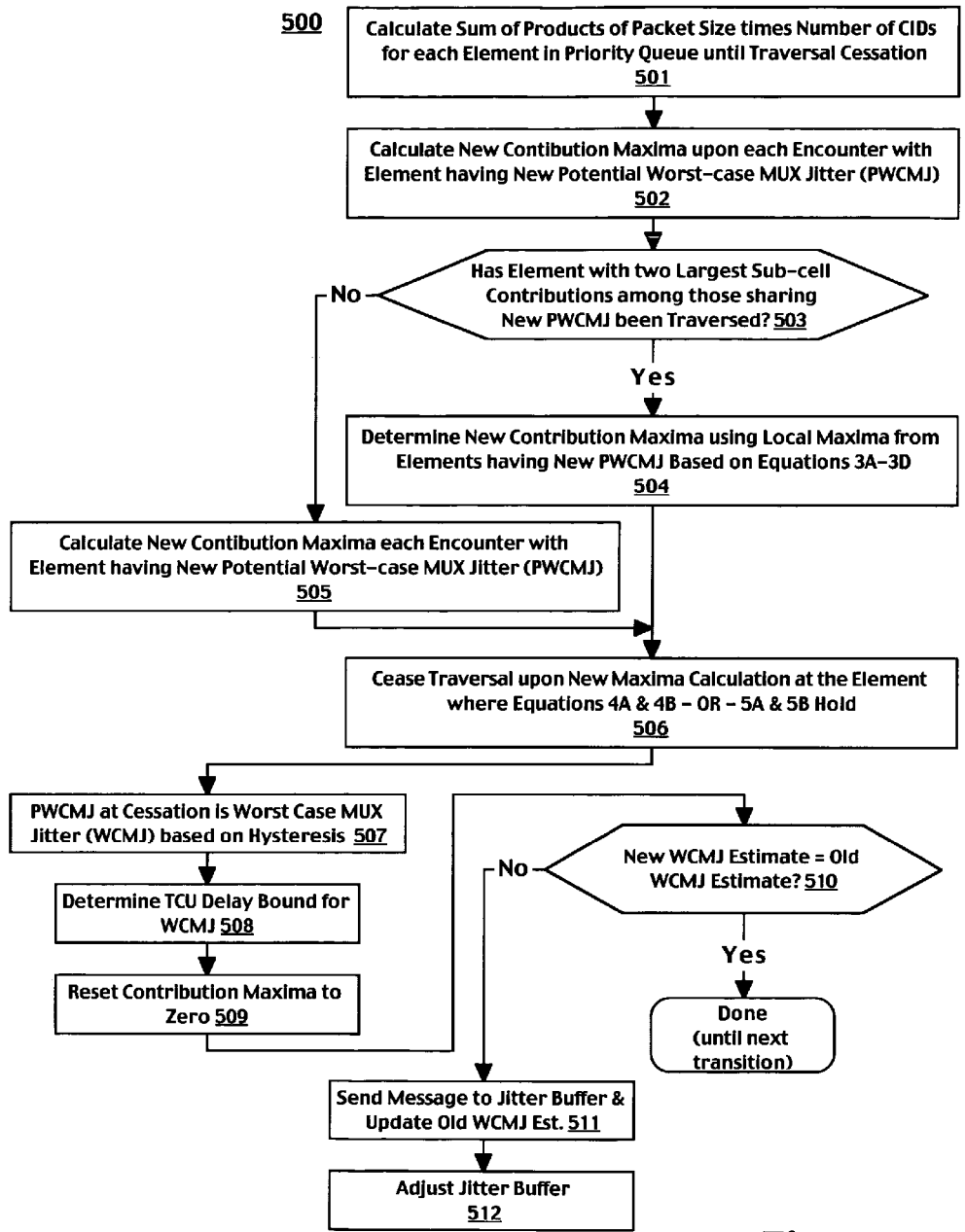
FIG. 5 is a flowchart of an exemplary process for determining a worst case jitter estimate, according to an embodiment of the present invention.

FIG. 5 is a flowchart of an exemplary process 500 for determining a worst case jitter estimate, according to an embodiment of the present invention. Process 500 begins with a step 501, during the traversal of the priority queue $\{(P_k, n_k, t_k, c_k) | k=1, \ldots, K\}$, wherein $\Sigma(n_k * P_k)$ is calculated at each element until the traversal ceases at the element with $k=k'$.

In step 502, new contribution maxima $C_{max1}$, $C_{max2}$ are calculated each time an element with a new $t_k$ (e.g., Potential Worst Case MUX Jitter, also referred to as 'PWCMJ') is encountered. Once an element with a new $t_k$ is encountered, the traversal does not cease until the new $C_{max1}$, $C_{max2}$ corresponding to the new $t_k$ are calculated. In step 503, it is determined whether the element (e.g., one or more elements) that has the two largest local sub-cell contributions from among the elements that share the new $t_k$ has been traversed. If so, then in step 504, these local maxima are used in the comparison, equations 3A-3D to determine the new $C_{max1}$, $C_{max2}$. If not, then in step 505, it is inferred that all elements that share the new $t_k$ have been traversed without determining both or any of the two largest sub-cell contributions, e.g., without encountering elements that cumulatively have greater than two CIDs that are in packet activity. Traversal does not cease until step 504 or 505 is completed.

Once the new $C_{max1}$, $C_{max2}$ corresponding to the elements that share the new $t_k$ have been calculated at the element $k=k''$, in step 506 traversal ceases when $$k=k'(k' \geq k'')$$

such that either of the following holds:

$$t_{k'} = D_{max}(\text{old})$$
and
$$\sum_{k=1}^{k'-1}(n_k * P_k) < (47 + C_{max1}) \leq \sum_{k=1}^{k'}(n_k * P_k);$$

Equations 4A, 4B $$t_{k'} \neq D_{max}(\text{old})$$
and
$$\sum_{k=1}^{k'-1}(n_k * P_k) < (47 + C_{max1} + C_{max2}) \leq \sum_{k=1}^{k'}(n_k * P_k).$$

Equations 5A, 5B

In step 507, the current $D_{max}$ is assigned the value of the PWCMJ, which is $t_k''$, $D_{max} = t_k''$. In step 508, a worst case jitter $J_{max}$ bound by the Timer_CU delay associated with MUX 392

$$J_{max} = \min(T_{cu}, D_{max})$$

is determined.

In step 509, contribution maxima $C_{max1}$, $C_{max2}$ are reset to zero for the next traversal, which gets triggered by the next transition.

The $T_{CU}$ bound worst case jitter determined is compared to the last worst case jitter estimate, determined at the last transition ($J_{max}(\text{old})$). In step 510, it is determined whether the newly determined worst case jitter $J_{max}$ estimate is the same or different from $J_{max}$ old.

Where $J_{max} = (J_{max}(\text{old}))$, process 500 is complete until a next transition. Where $J_{max}$ differs from $J_{max}$ old, in step 511 an in-band control message is sent to downstream jitter buffer 24. In step 512, jitter buffer 24 is adjusted to aggressively anticipate the new worst case jitter.

Figure 6:
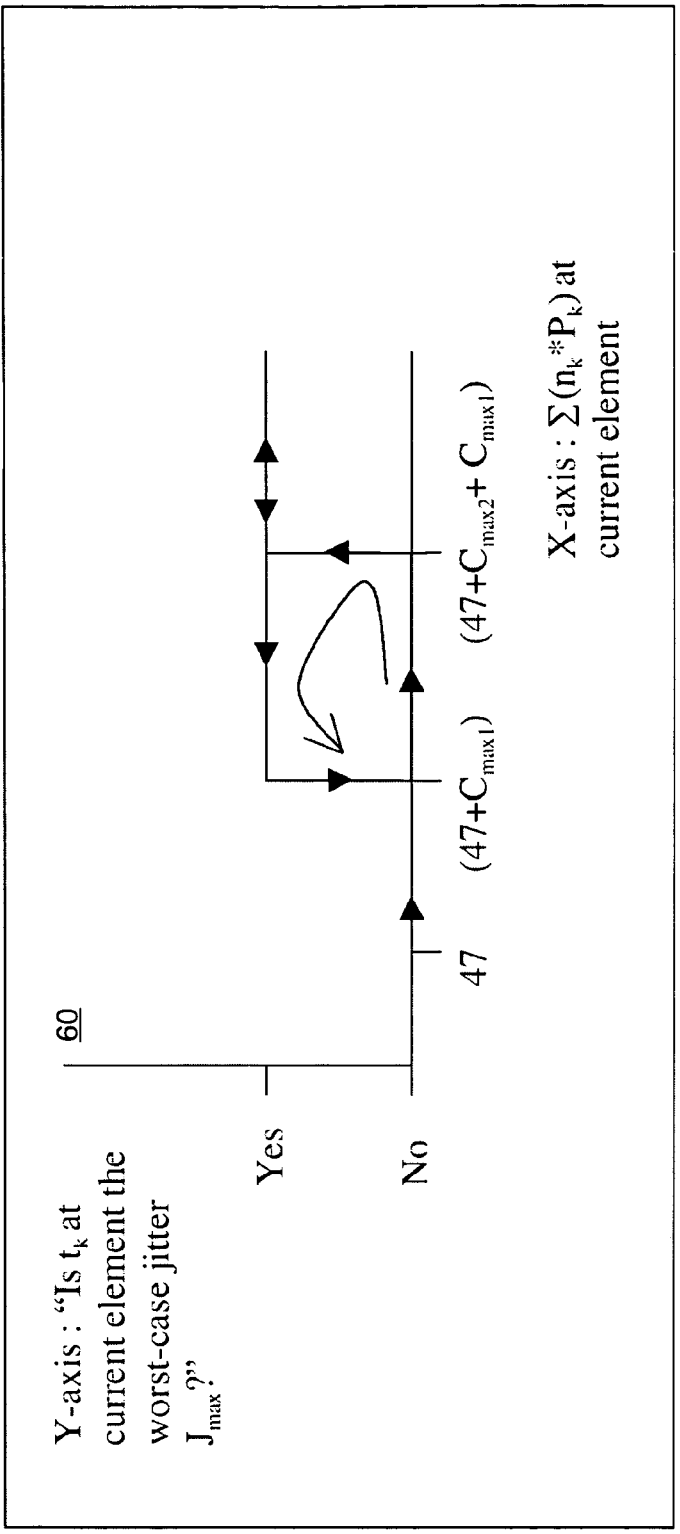
FIG. 6 depicts an exemplary decision loop for controlling a network de-multiplexing function on the basis of hysteresis, according to an embodiment of the present invention.

FIG. 6 depicts an exemplary decision loop 60 for controlling a network de-multiplexing function on the basis of hysteresis, according to an embodiment of the present invention. Decision loop 60 represents the decision process at each element with $t_k$, during each priority queue traversal, after $C_{max1}$ and $C_{max2}$ for the group of elements with $t_k$ have been determined. It should be appreciated that the $C_{max1}$ and $C_{max2}$ are calculated newly for each traversal. Hence, the $C_{max1}$ in $(47+C_{max1})$ need not be equal to the $C_{max1}$ in $(47+C_{max1+} + C_{max1})$ during a reduction in $\Sigma(n_k * P_k)$ due to a CID moving out of packet activity.

Figure 7:
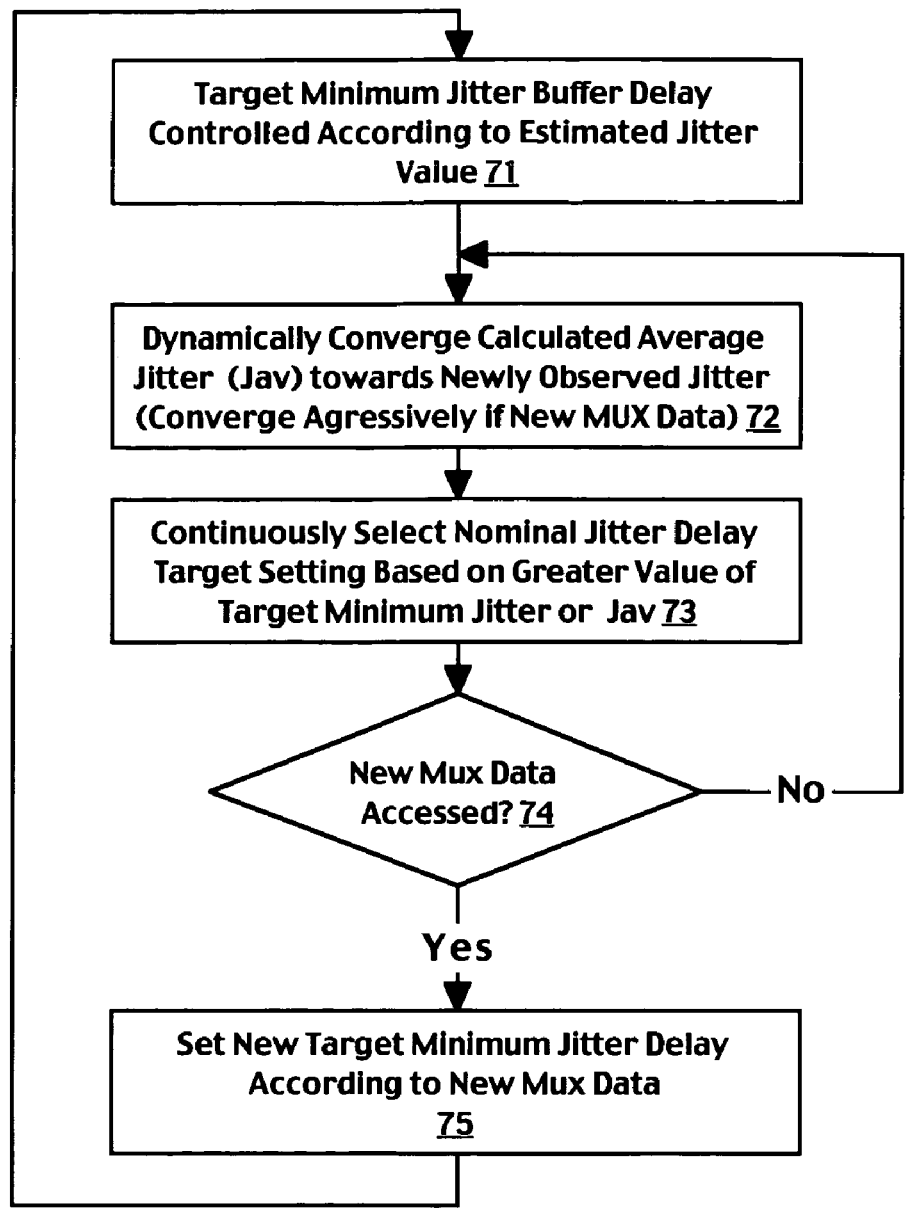
FIG. 7 is a flowchart of an exemplary method for adjusting a buffering function, according to an embodiment of the present invention.

FIG. 7 is a flowchart of an exemplary method 700 for adjusting a buffering function, according to an embodiment of the present invention. Process 70 begins with a step 71, wherein a target minimum jitter delay of a jitter buffer is controlled, for instance according to an estimated worst case jitter value (e.g., process 10; FIG. 1).

In step 72, the jitter buffer dynamically converges a calculated average jitter aggressively towards the newly observed jitter. In step 73, the jitter buffer continuously selects a value for a nominal jitter delay target setting to correspond to the target minimum jitter delay and/or the calculated average jitter, based on whichever one has a greater magnitude.

In step 74, it is determined whether new multiplexing data (e.g., control inputs 313, 314 and SID data in cell input 47; FIG. 4) is accessed. Where no new multiplexing data is accessed, process 70 repeats, continuing to dynamically converge and select as in steps 72 and 73, respectively.

Where new network multiplexing data is accessed, in step 75, the new target minimum jitter delay is set for the jitter buffer with the new estimated worst case jitter value corresponding to the new data. Process 70 then repeats steps 71-74.

FIG. 8 is a flowchart of an exemplary method 80 for operating a network, according to an embodiment of the present invention. Process 80 begins with step 81, wherein a network de-multiplexing function is controlled with a hysteresis based process such as processes 10 and 500.

Operating the network with such a hysteresis based de-multiplexing function that can anticipate multiplexing related jitter changes and can deter unnecessary transmission delay, deter data loss related to packet dropping and thus prevent deterioration of voice and other variable bit stream (VBS) high QoS network traffic.

In step 82, access to this network is provided (e.g., allowed) based on the such transmission quality. In step 83, consideration such as a fee is assessed for allowing such network access, completing process 80.

In summary, embodiments of the present invention provide a method, system and apparatus for controlling a network post-demultiplexing function such as dejittering. The method includes accessing data relating to a multiplexing function of said network. The data is processed according to a hysteresis property relating to the multiplexing function. Based on this processing, a jitter value associated with said multiplexing function is estimated, which predicts a worst-case jitter associated with the multiplexing function. A buffering function related to the post-demultiplexing function is adjusted according to the estimated worst-case jitter value. In response to such adjustment, the buffering function adapts to anticipate a change in the worst-case jitter.

Thus, embodiments of the present invention, a method, system and apparatus for controlling a network post-demultiplexing function, are described. While the present invention has been described in particular embodiments, it should be appreciated that the present invention should not be construed as limited by such embodiments, but rather construed according to the following claims.

What is claimed is:

1. A method, comprising:
    receiving at least one data cell over a packet-switched network from a transmitting network device, the data cell including voice data from multiple call connections multiplexed into the data cell by the transmitting network device;
    de-multiplexing the data cell to separate the voice data according to the corresponding call connections and to identify information related to multiplexing the voice data into the data cell by the transmitting network device;
    receiving information associated with an alarm corresponding to one or more call connections over the network, where the alarm indicates a lack of voice traffic in corresponding call connection;
    estimating a jitter value based, at least in part, on the information related to the multiplexing of the voice data into the data cell and the alarm, the jitter value to predict a delay introduced by the transmitting network device when multiplexing the voice data into the data cell;
    buffering the de-multiplexed voice data to compensate for a delay associated with the transmission of the voice data over the packet-switched network; and
    adjusting the delay associated with the transmission of the voice data over the packet-switched network based, at least in part, on the estimated jitter value.

2. The method as recited in claim 1, further comprises:
    extracting information from a Silence Insertion Descriptor in the data cell; and
    estimating the jitter value based, at least in part, on the information related to the multiplexing of the voice data into the data cell and from information in the Silence Insertion Descriptor.

3. The method as recited in claim 1, further comprises:
    receiving information associated with a number of call connections over the network; and
    estimating the jitter value based, at least in part, on the information related to the multiplexing of the voice data into the data cell and from the number of call connections over the network.

4. The method as recited in claim 1, wherein said network comprises a permanent virtual connection, said permanent virtual connection comprising one or more channels, each channel corresponding to one or more of the call connections and having a corresponding channel identifier, and wherein said voice data comprises information relating to a dynamic characteristic of said permanent virtual connection.

5. The method as recited in claim 1, further comprises
    processing the information related to the multiplexing of voice data into the data cell according to a hysteresis property of the multiplexing; and
    estimating the jitter value based, at least in part, on the information related to the processed information that corresponds to traversing of a priority queue.

6. The method as recited in claim 1, further comprises:
    updating a target minimum jitter delay of a jitter buffer with said estimated jitter value;
    dynamically converging a calculated average jitter aggressively towards newly observed jitter in arriving packet traffic; and
    continuously selecting a value for a nominal jitter delay target setting to correspond to one of said target minimum jitter delay or said calculated average jitter, based on their respective greater magnitude.

7. The method as recited in claim 6 further comprises:
    repeating said updating, said dynamically converging, and continuously selecting until another data cell including new information related to multiplexing in the another data cell;
    updating a new target minimum jitter delay of said jitter buffer with a new estimated worst case jitter value corresponding to said new information; and
    repeating said updating, said dynamically converging, and continuously selecting.

8. A system, comprising:
    a bus;
    a data access module coupled to said bus, to receive at least one data cell over a packet-switched network from a transmitting network device, the data cell including voice data from multiple call connections multiplexed into the data cell by the transmitting network device;

a processor coupled to said bus, configured to:
de-multiplex the data cell to separate the voice data according to the corresponding call connections and to identify information related to multiplexing the voice data into the data cell by the transmitting network device;
receive information associated with an alarm corresponding to one or more call connections over the network, where the alarm indicates a lack of voice traffic in the corresponding call connection; and
estimate a jitter value based, at least in part, on the information related to the multiplexing of the voice data into the data cell and the alarm, the jitter value to predict a delay introduced by the transmitting network device when multiplexing the voice data into the data cell;
a buffer coupled with said bus to buffer to the de-multiplexed voice data to compensate for a delay associated with the transmission of the voice data over the packet-switched network, wherein said processor to adjust the delay of the buffer based, at least in part, on the estimated jitter value.

9. The system as recited in claim 8, where the processor is configured to extract information from a Silence Insertion Descriptor in the data cell; and
estimate the jitter value based, at least in part, on the information related to the multiplexing of the voice data into the data cell and from information in the Silence Insertion Descriptor.

10. The system as recited in claim 8 wherein said network comprises a permanent virtual connection, said permanent virtual connection comprising one or more channels, each channel corresponding to one or more of the call connections and having a corresponding channel identifier, and wherein said voice data comprises information relating to a dynamic characteristic of said permanent virtual connection.

11. The system as recited in claim 8, where the processor is configured to process the information related to the multiplexing of voice data into the data cell according to a hysteresis property of the multiplexing, and estimate the jitter value based, at least in part, on the information related to the processed information.

12. The system as recited in claim 8 wherein said buffer is configured to update a target minimum jitter delay of said buffer with said estimated jitter value;
dynamically converge a calculated average jitter aggressively towards newly observed jitter in arriving packet traffic; and
select a value for a nominal jitter delay target setting to correspond to one of said target minimum jitter delay or said calculated average jitter, based on their respective greater magnitude.

13. The system as recited in claim 12 wherein said processor is configured to receive information associated with a number of call connections over the network, and estimate the jitter value based, at least in part, on the information related to the multiplexing of the voice data into the data cell and from the number of call connections over the network.

14. The system as recited in claim 8 wherein said processor comprises:
a hysteresis evaluator, for computing said estimated jitter value; and
a buffering controller disposed with said hysteresis evaluator, to control said buffer by accessing said estimated jitter value, and generating a control signal according to said estimated jitter value, the buffer to anticipate a change in jitter according to the estimated jitter value in response to the control signal.

15. A system for controlling a network post-demultiplexing function, comprising:
means for receiving at least one data cell over a packet-switched network from a transmitting network device, the data cell including voice data from multiple call connections multiplexed into the data cell by the transmitting network device;
means for de-multiplexing the data cell to separate the voice data according to the corresponding call connections and to identify information related to multiplexing the voice data into the data cell by the transmitting network device;
means for receiving information associated with an alarm corresponding to one or more call connections over the network, where the alarm indicates a lack of voice traffic in corresponding call connection;
means for estimating a jitter value based, at least in part, on the information related to the multiplexing of the voice data into the data cell and the alarm, wherein said estimated jitter value to predict a delay introduced by the transmitting network device when multiplexing the voice data into the data cell;
means for buffering the de-multiplexed voice data to compensate for a delay associated with the transmission of the voice data over the packet-switched network; and
means for adjusting the delay associated with the transmission of the voice data over the packet-switched network based, at least in part, on the estimated jitter value.

16. An apparatus, comprising:
a control path processor to monitor a property relating to multiplexing associated with a network and generating a corresponding control signal, wherein the control path processor includes an alarm module to generate the control signal having an alarm that indicates a lack of voice traffic in a corresponding call connection;
a demultiplexer to receive said control signal from the control path processor, to de-multiplex packetized traffic from a transmitting processing device over said network, the packetized traffic including at least one voice packet including voice data from multiple call connections that is multiplexed into the packet by the transmitting network device, wherein said demultiplexer configured to access data relating to multiplexing the voice data into said packet by the transmitting network device, and wherein said demultiplexer to estimate a jitter value based, at least in part, on the information related to the multiplexing of the voice data into the data cell and the alarm and to generate a control message based, at least in part, on the estimated jitter value; and
a buffer to receive said control message and to buffer the demultiplexed packetized traffic according to said control message.

17. The apparatus as recited in claim 16 wherein said control path processor includes a connection admission control module to generate the control signal indicating a number of call connections over the network.

18. The system of claim 15, further comprising means for extracting information from a Silence Insertion Descriptor in the data cell, wherein the means for estimating is configured to estimate the jitter value based, at least in part, on the information in the Silence Insertion Descriptor.

19. The system of claim 15, further comprising means for receiving information associated with a number of call connections over the network, wherein the means for estimating is configured to estimate the jitter value based, at least in part, on the information from the number of call connections over the network.

20. The system of claim 15, further comprising means for processing the information related to multiplexing voice data into the data cell according to a hysteresis property associated with the multiplexing, wherein the means for estimating is configured to estimate the jitter value based, at least in part, on the information related to at least a portion of the processed information that corresponds to traversing of a priority queue.

* * * * *

UNITED STATES PATENT AND TRADEMARK OFFICE
CERTIFICATE OF CORRECTION

PATENT NO. : 7,583,707 B2  Page 1 of 1
APPLICATION NO. : 11/090395
DATED : September 1, 2009
INVENTOR(S) : Gangadharan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 674 days.

Signed and Sealed this

Fourteenth Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,583,707 B2  Page 1 of 1
APPLICATION NO. : 11/090395
DATED : September 1, 2009
INVENTOR(S) : Sreekanth Gangadharan et al.

It is certified that error appears in the above-identified patent and that said Letters Patent is hereby corrected as shown below:

Column 16, line 51 (Claim 16):   Replace "alarm" with -- alarm, --.

Signed and Sealed this

Sixteenth Day of November, 2010

David J. Kappos
*Director of the United States Patent and Trademark Office*